United States Patent [19]
Zheng

[11] Patent Number: 5,452,934
[45] Date of Patent: Sep. 26, 1995

[54] AUTOMOBILE SUNSHIELD HAVING FIGURE-8 SUPPORT LOOP

[76] Inventor: Yu Zheng, 1065 Howard Ave., Covina, Calif. 91722

[21] Appl. No.: 374,838

[22] Filed: Jan. 19, 1995

[51] Int. Cl.⁶ .................................................. B60J 3/00
[52] U.S. Cl. ................................ 296/97.7; 160/370.21
[58] Field of Search ............................ 296/97.7, 97.8; 160/370.21

[56] References Cited

U.S. PATENT DOCUMENTS

| | | |
|---|---|---|
| 3,990,463 | 11/1976 | Norman . |
| 4,202,396 | 5/1980 | Levy . |
| 4,815,784 | 3/1989 | Zheng ........................ 296/97.7 |
| 5,024,262 | 6/1991 | Huang ........................ 296/97.8 |
| 5,035,460 | 7/1991 | Huang ........................ 296/97.7 X |
| 5,213,147 | 5/1993 | Zheng ........................ 296/97.7 X |

Primary Examiner—Joseph D. Pape
Attorney, Agent, or Firm—Raymond Sun

[57] ABSTRACT

An automobile window sunshield comprises a collapsible flexible loop member assuming a Figure-8 configuration, the Figure-8 configuration defining two closed loops connected by an overlapping portion acting as a hinge portion. The Figure-8 loop member has a natural bias that causes the two closed loops to fold toward each other about the overlapping hinge portion. The Figure-8 loop member and the two closed loops can each assume an expanded position and a collapsed position. The sunshield further comprises a fabric for substantially covering the Figure-8 loop member, the Figure-8 loop member and its two closed loops substantially supporting the fabric in particular areas so that the fabric assumes the particular configuration of the Figure-8 loop member and its two closed loops in their expanded position. The two closed loops and their associated fabric are foldable on top of each other about the hinge portion to have the closed loops and their associated fabric overlaying each other and with the overlaying closed loops collapsible to the collapsed positions by twisting and folding to form a plurality of concentric rings and layers of fabric to substantially reduce the size of the sunshield in the collapsed position.

16 Claims, 8 Drawing Sheets

AUTOMOBILE SUNSHIELD HAVING FIGURE-8 SUPPORT LOOP

TECHNICAL FIELD

The present invention relates to sunshields, and in particular, to a collapsible automobile window sunshield or shade. The sunshield of the present invention is supported by a resilient loop member that has a Figure-Eight configuration. The sunshield may be twisted and folded to reduce the overall size of the sunshield.

BACKGROUND ART

A number of prior art automobile sunshields are well-known for use in shielding the interior of an automobile from unwanted heat and sunlight. These sunshields may be positioned against an interior window surface, but are typically positioned against the windshield because of the difficulty of retaining these sunshields against the other window surfaces.

One example is U.S. Pat. No. 4,202,396 to Levy, which illustrates a folding cardboard sunshield. The sunshield is provided with creases or folds so that individual panels are formed and may be stacked in an accordion-like manner for storage. Although Levy describes the sunshield as being retained against a window surface by a number of methods, including the use of hooks and clamping the sunshield between the side window and door frame, the most common and practical way is to retain the sunshield in position against a windshield by the two visors adjacent the ceiling of the passenger compartment. However, even when it is held against the windshield, this sunshield tends to return to the folded position and therefore does not effectively cover the entire windshield.

Another example is U.S. Pat. No. 5,024,262 to Huang, which illustrates a collapsible sunshield which is a sheet material supported by a single resilient loop along its borders. This sunshield may also be retained in position against a windshield by the two visors. This sunshield provides better coverage for the windshield than the sunshield described in U.S. Pat. No. 4,202,396 to Levy. However, since its single loop must be wide enough to cover the entire windshield, the sunshield is necessarily very wide and bulky, which makes it very difficult for an individual to perform the folding steps needed to collapse it to a smaller size.

A further example is illustrated in my earlier U.S. Pat. No. 4,815,784 to Zheng. This sunshield provides two resilient loops, each covered by a sheet material and connected by an interconnecting fabric, with the two loops foldable upon each other to make it easier for the individual to collapse the combined two loops into a smaller size. Each resilient loop portion of the sunshield may be retained in position against the windshield by one of the two visors. However, each loop must be carefully positioned against the windshield and then retained by a visor; otherwise, this sunshield will not be effective in covering the entire windshield. This is because the two loops are separate and are only connected by the interconnecting piece of fabric, so that both loops must be manually positioned against the windshield and manually spread out to cover the entire windshield.

A problem associated with each of these sunshields is that they require the use of the two visors to effectively retain them in position against the windshield. Although Huang teaches in his U.S. Pat. No. 5,024,262 that the one-loop sunshield may be held against the windshield by the spring forces of the loop only, this method has not proven effective and the use of the two visors is still required for effective operation. Thus, the above-described sunshields are not easily adapted for use with side windows or rear windows, and are rendered ineffective for use in covering the windshield if one or both visors of the automobile are either not deployed properly or inoperable. Even if these sunshields are equipped with a conventional attachment device, such as suction cups, for example, for attaching the sunshield to the side or rear windows, the size and weight of the sunshield will typically require several such attachment devices to effectively retain the sunshield against the window without any further assistance from another mechanism. If insufficient suction cups or similar attachment devices are provided, the sunshield will sag at certain locations, thereby allowing heat and sunlight to enter the interior of the automobile.

Thus, there still remains a need for an automobile window sunshield which effectively covers the entire automobile window and blocks sunlight and heat, is adapted for convenient use with any of the automobile windows, is simple in construction and inexpensive to manufacture, and may be conveniently stored.

DISCLOSURE OF INVENTION

In order to accomplish the objects of the present invention, the automobile window sunshield according to the present invention comprises a collapsible flexible loop member assuming a Figure-8 configuration. The Figure-8 configuration defines two closed loops connected by an overlapping portion acting as a hinge portion. The Figure-8 loop member and the two closed loops can each assume an expanded position and a collapsed position. The sunshield further comprises a fabric for substantially covering the Figure-8 loop member, the Figure-8 loop member and its two closed loops substantially supporting the fabric in particular areas so that the fabric assumes the particular configuration of the Figure-8 loop member and its two closed loops in their expanded position. The two closed loops and their associated fabric are foldable on top of each other about the overlapping hinge portion to have the closed loops and their associated fabric overlaying each other and with the overlaying closed loops collapsible to the collapsed positions by twisting and folding to form a plurality of concentric rings and layers of fabric to substantially reduce the size of the sunshield in the collapsed position.

The Figure-8 loop member according to the present invention has a natural bias that causes the two closed loops to fold toward each other about the overlapping hinge portion. This natural bias of the Figure-8 loop member causes the two closed loops to impinge against an automobile window or windshield when the sunshield is retained thereagainst. The two closed loops formed by the Figure-8 configuration are disposed substantially symmetrical to each other and are substantially equal in size.

The sunshield according to the present invention further comprises at least one attachment device provided on the window-facing side of the fabric. In a preferred embodiment, the attachment device comprises a suction cup. The suction cups are adapted to be pressed against the automobile window or windshield when the sunshield is retained against the automobile window or windshield to hold the sunshield against the window or windshield.

The sunshield according to the present invention further comprises a loop retaining portion provided along the fabric.

A sleeve is provided along the loop retaining portion for retaining the Figure-8 loop member. A layer of reflective material may be provided on the window-facing side of the fabric.

The sunshield of the present invention may be deployed against a window or windshield of an automobile according to the following method. The first step provides a collapsible sunshield comprising (i) a collapsible flexible loop member assuming a Figure-8 configuration, the Figure-8 configuration defining two closed loops connected by an overlapping portion acting as a hinge portion, with the Figure-8 loop member having a natural bias that causes the two closed loops to fold toward each other about the overlapping hinge portion; and (ii) a fabric for substantially covering the Figure-8 loop member, the Figure-8 loop member and its two closed loops substantially supporting the fabric in particular areas so that the fabric assumes the particular configuration of the Figure-8 loop member in its expanded position, the fabric having a window-facing side. The second step provides at least one attachment device on the window-facing side of the fabric. The third step includes positioning the sunshield against the automobile window or windshield to be covered, with the window-facing side of the sunshield facing the automobile window or windshield. In the fourth step, the attachment device is attached to the automobile window or windshield. In the fifth step, the natural bias of the Figure-8 loop member causes the two closed loops to impinge against the automobile window or windshield. In the sixth step, which applies only to a front windshield of the automobile, the two visors of the automobile may be flipped down against the sunshield to further retain the sunshield against the windshield.

The sunshield according to the present invention may be modified so that it may be deployed against the outside of a windshield or rear window to cover the windshield or rear window from ice and snow. Two elastic members are provided, with one each being attached to a separate one of the two fabric pieces that span and cover each of the two closed loops. A suction cup is attached to a free end of each elastic member. After the sunshield has been deployed against the outside of a windshield or rear window, the elastic members may be stretched into the interior of the automobile and the suction cups attached to the inside of the windshield or rear window.

The sunshield according to the present invention provides a Figure-8 loop member as support, the Figure-8 configuration of this loop member carrying a natural bias to fold its two closed loops together. This natural bias enables the sunshield, when equipped with one or more attachment devices, to be used effectively with all windows of an automobile, including the windshield, side windows and the rear window, and on both the outside and the inside of the windshield and the rear window. In this regard, only one or two attachment devices positioned at the central portion or inside the two loop portions of the sunshield are needed, because the natural bias to fold the closed loops together will obviate the need for additional attachment devices to be provided at other locations of the sunshield. This reduces the complexity of the construction of the sunshield, and also makes it more convenient to deploy in position and to store. The natural bias of the Figure-8 loop member also makes it easier to fold the sunshield during the folding and collapsing operation.

BEST MODES FOR CARRYING OUT THE INVENTION

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
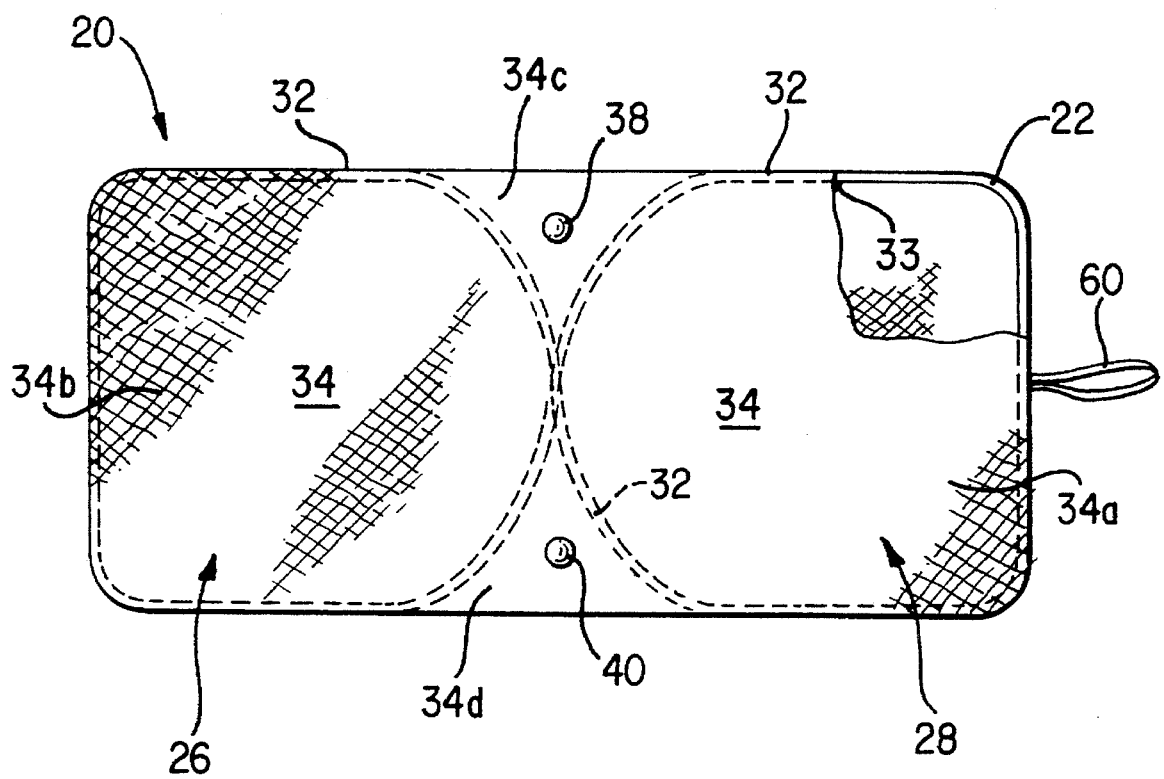
FIG. 1 is an elevational view partially broken away showing an automobile sunshield or shade of the present invention illustrating the internal resilient support loop.
Figure 2:
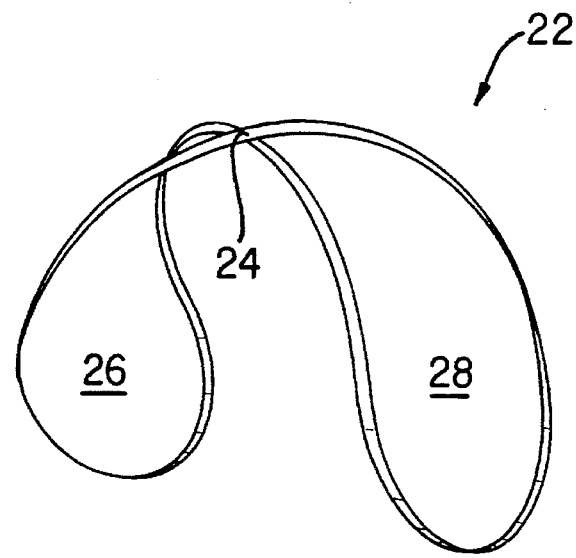
FIG. 2 is a perspective view of the resilient support loop member of the sunshield of FIG. 1 assuming a Figure-8 configuration.
Figure 8:
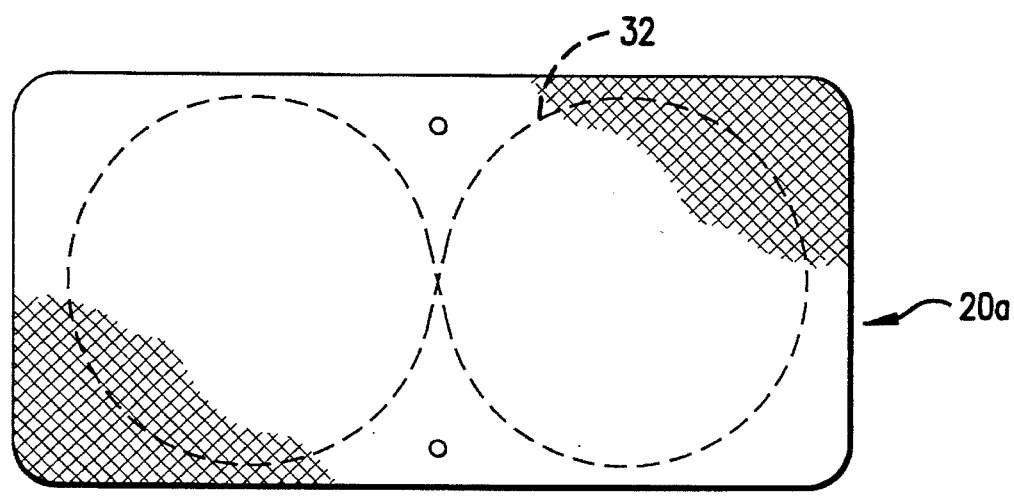
FIG. 8 is an elevational view of a second embodiment of the sunshield according to the present invention.

As shown in FIGS. 1 and 2, the sunshield 20 is formed by one resilient loop member 22 that has been twisted into a Figure-8 configuration. Referring to FIG. 2, the loop member 22 comprises a closed resilient loop. To form the Figure-8 configuration, one end of the closed loop 22 is grasped and twisted by 360 degrees with respect to the other end. The overlapping or cross-over portions of the loop 22 may then be secured together at 24, such as by riveting, stapling, sewing, or other conventional securing mechanisms, to hold the loop 22 in the Figure-8 configuration. Alternatively, the overlapping portions of the loop member 22 may be left free and unsecured if the loop member 22 is retained in the loop retaining portion 32 described below. When the loop member 22 is held in this configuration, two closed loops 26 and 28 are defined, with the overlapping portion or point 24 acting as a hinge for the two closed loops 26 and 28. Each closed loop 26 and 28 is substantially equal in size and symmetrically disposed. Depending on the size and shape of the resilient loop member 22, the closed loops 26 and 28 may assume any variety of shapes, including circular or oval. Further, as shown in FIG. 2, when the loop member 22 is formed into this Figure-8 configuration, the two closed loops 26 and 28 are biased to fold towards each other.

The resilient loop member 22 is preferably made from a relatively strong springy material which is flexible enough to allow it to be coiled. The preferred material for the loop member 22 includes flat spring steel stock, and in particular, stainless steel, although plastic may also be used. The resilient loop member 22 may be provided as a single closed loop, or as a continuous strip of material with both ends held together by a retaining connector or other conventional attachment mechanism.

Referring to FIG. 1, the loop member 22 is retained in a loop retaining portion 32 of one or more fabric pieces. Since the Figure-8 loop member 22 forms two closed loops 26 and 28, two fabric pieces 34a and 34b are provided. Each fabric piece 34a and 34b forms a panel within the respective closed loop 26 and 28 and is preferably held in tension. One side of each fabric 34a, 34b is used as the window-facing side 36a, 36b (see FIG. 5). This is the side of the fabric 34a, 34b that tends to be naturally biased towards itself.

The fabric pieces 34a, 34b are preferably made from a sheet material which is effective in reflecting and blocking light and heat from entering the interior of the automobile, and may be made from sheet fabric, woven fabric, PVC, metal foil, and even films. A layer of metallized fabric or other reflective material may be added to the window-facing sides 36a, 36b of the fabric 34a, 34b to further aid in reflecting and blocking light and heat. A less expensive, though less effective, alternative is to choose a white fabric as the reflective surface. In addition, the window-facing sides 36a, 36b may be provided with a different color so that the user can easily recognize it, even though it should be inherently recognizable from the natural biasing of the sunshield 20 and its loop member 22.

The loop member 22 may be retained at the loop retaining portion 32 by a number of different methods. In a first preferred method, which is illustrated in FIG. 1, a sleeve 33 is formed along the loop retaining portion 32 to house or retain the loop member 22. The sleeve 33 may be formed by folding a peripheral edge of the fabric over the loop member 22 and then stitching, or by providing a separately-formed tubular sleeve that is stitched to the fabric 34a, 34b along the loop retaining portion 32. In a second preferred method, the loop member 22 may be mechanically fastened, glued or fused to the loop retaining portion 32. Other conventional methods may be used without departing from the spirit and scope of the present invention.

It will also be appreciated that the loop retaining portion 32 can be provided either at the periphery of the fabric 34a, 34b, as shown in FIG. 1, or at a portion of the fabric 34a, 34b interior from the periphery, as shown in FIG. 8. The only requirement is that the closed loops 26 and 28 be positioned so that they can sufficiently support the sunshield 20 to effectively cover the automobile window or sunshield. Aside from the position of the loop retaining portion 32, the sunshield 20a in FIG. 8 is the same as sunshield 20 of FIG. 1.

In a preferred embodiment, two additional fabric pieces 34c and 34d may be stitched or otherwise provided between the fabric pieces 34a and 34b held in the closed loops 26 and 28. Alternatively, as described above in the first and second preferred methods of retaining the loop member 22 to the loop retaining portion 32, a single piece of fabric may be provided for the sunshield 20, with the Figure-8 loop member 22 (a) fastened or glued to the fabric at the loop retaining portion 32, or (b) retained in a sleeve 33 that is stitched to the loop retaining portion 32. The two fabric pieces 34c and 34d provide additional coverage for the automobile window or windshield against heat and sunlight. When provided, the fabric pieces 34c and 34d also allow two suction cups 38 and 40 to be attached thereto on the window-facing sides 36a, 36b. These suction cups 38 and 40 provide an additional mechanism for holding the sunshield 20 in position against an automobile window or windshield, as described in greater detail hereinbelow.

Figure 10:
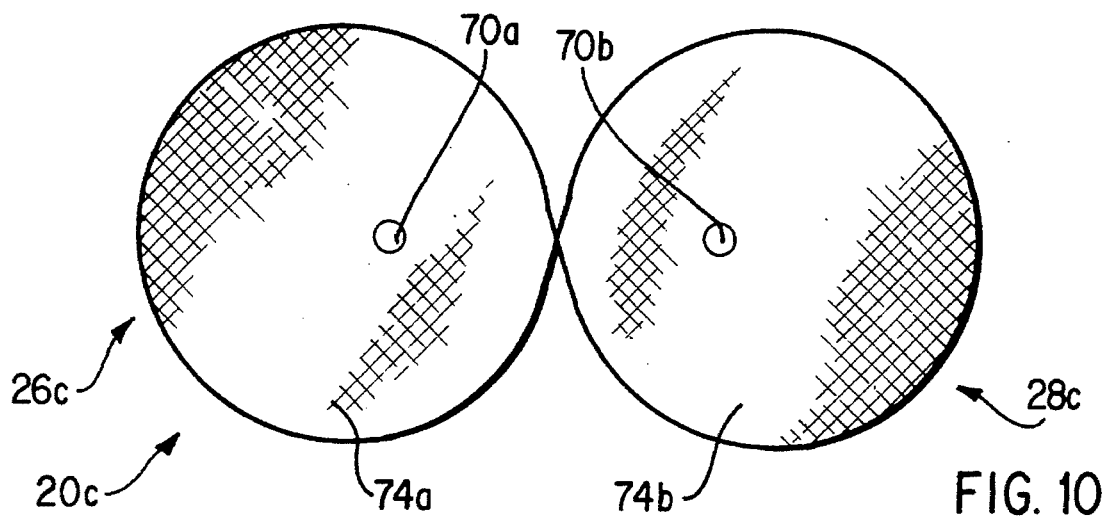
FIG. 10 is an elevational view of a fourth embodiment of the sunshield according to the present invention.
Figure 11:
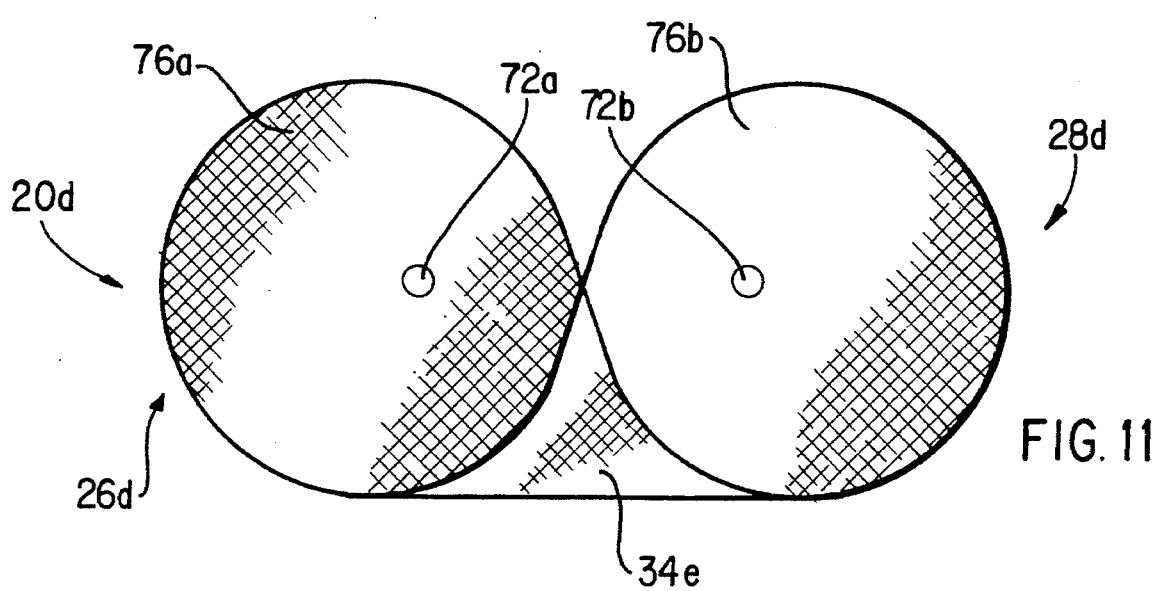
FIG. 11 is an elevational view of a fifth embodiment of the sunshield according to the present invention illustrating certain modifications made to the sunshield of FIG. 10.

It will be appreciated that the suction cups 38 and 40 can be positioned anywhere on the window-facing sides 36a, 36b of the fabric 34a, 34b, 34c, 34d. For example, the sunshields 20c and 20d of FIGS. 10 and 11, respectively, provide one suction cup 70a, 72a on one fabric piece 74a, 76a, respectively, within a closed loop portion 26c, 26d, and another suction cup 70b, 72b on the other fabric piece 74b, 76b, respectively, within the other closed loop portion 28c, 28d. In sunshield 20c, there are no other fabric pieces between the two closed loop portions 26c, 28c, or outside of these closed loop portions 26c, 28c. In sunshield 20d, there is provided only one fabric piece 34e between the lower part of the closed loop portions 26d, 28d, but there is no other fabric at any other point outside the closed loop portions 26d, 28d. The sunshield 20d can be positioned against a windshield 42 with the fabric piece 34e adjacent the dashboard 46 of an automobile and with the rear view mirror 54 of the automobile positioned between the upper parts of the closed loop portions 26d, 28d where there is no fabric piece.

Further, it will be appreciated by those skilled in the art that other conventional attachment devices, such as snaps or VELCRO™ may be used in place of the suction cups 38, 40, 70a, 70b, 72a, 72b without departing from the spirit and scope of the present invention.

Figure 3:
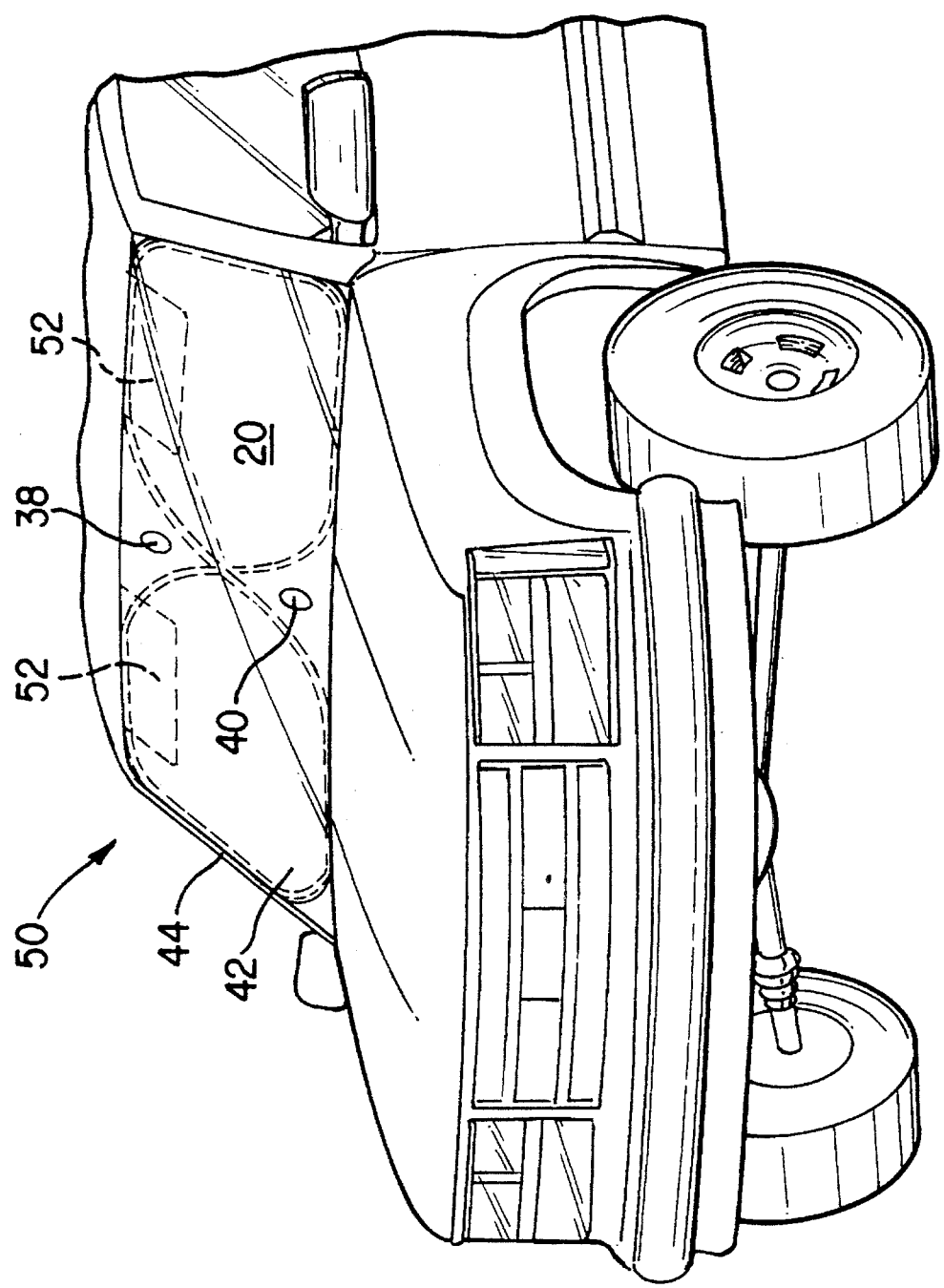
FIG. 3 is a perspective view of the sunshield of FIG. 1 in position behind an automobile windshield.
Figure 4:
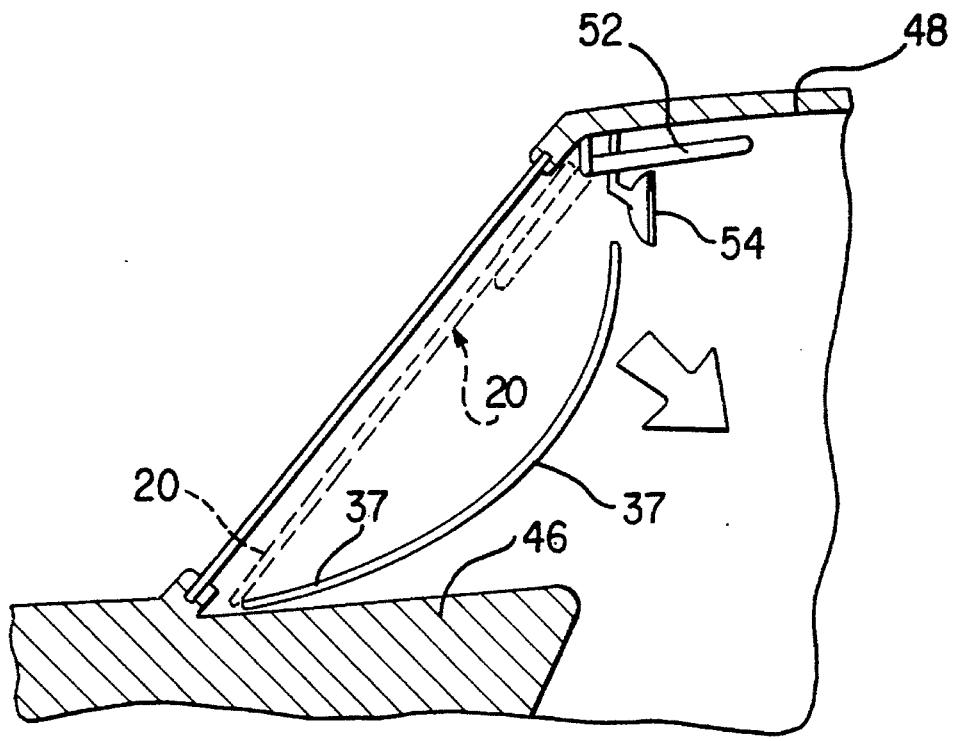
FIG. 4 is a side elevational view of the sunshield of FIG. 1 in position behind an automobile windshield.

FIG. 3 illustrates the sunshield 20 in position against a windshield 42. Although the operation of the sunshield 20 is shown in connection with a windshield, it is understood that the sunshield 20 can also be used effectively in the same manner with side and rear windows. The windshield 42 is held in position by a frame 44 and the sunshield 20 is positioned between a dashboard 46 and a ceiling 48 of the automobile 50 (see also FIG. 4). Visors 52 (shown in phantom in FIG. 3) and the rear view mirror 54 may be used to provide further support for the sunshield 20 against the windshield 42, although it is understood that the visors 52 are not necessary if the suction cups 38, 40 are used. FIG. 4 illustrates a side view of the automobile illustrating the sunshield 20 in dotted position being retained behind the windshield 42 and further supported by the visors 52 and the rear view mirror 54. In full position shown by the reference numeral 37, the sunshield 37 is illustrated to be bent for easy placement or removal from the windshield 42.

Figure 5:
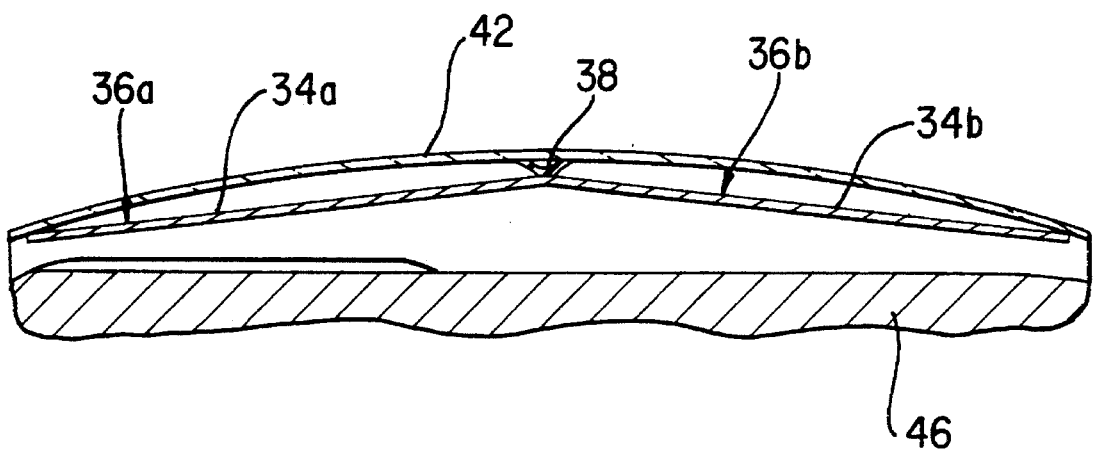
FIG. 5 is a top plan view of the sunshield of FIG. 1 in position behind an automobile windshield.

In particular, the natural bias of the Figure-8 loop member 22 enables the sunshield 20 to be retained more securely against the windshield 42, and to more effectively cover the windshield 42. Referring to FIG. 5, the suction cups 38 and 40 may be pressed against the windshield 42. The bias of the loop member 22 forces each closed loop 26 and 28 to impinge firmly against the windshield 42. When so utilized, the entire span or width of the sunshield 20 and its two closed loops 26 and 28 will be firmly retained and spread out over substantially the whole area of the windshield 42 without the need to manually adjust the sunshield 20, thereby ensuring effective coverage of the windshield 42.

In most cases, either one or both suction cups 38 and 40 alone are sufficient for retaining the sunshield 20 against the windshield 42 or any side window or rear window where there are no overhanging visors, and there is no need to provide additional suction cups at the outer ends of the sunshield 20. However, when used to cover a windshield 42, the visors 52 may also be flipped down to assist in retaining the closed loops 26 and 28 against the windshield 42. When the sunshield 20 is to be stored, the sunshield 20 can be easily removed from the windshield 42 by pulling the suction cups 38 and 40 from the windshield 42. These suction cups 38 and 40 can also be removably attached to the fabric pieces 34c and 34d so that worn-out or defective suction cups 38 and 40 can be replaced after a period of use.

The shape of the closed loops 26 and 28, and of the resulting sunshield 20, is not important as long as they are sized and shaped so that they sufficiently support the sunshield 20 to effectively cover the entire windshield 42. Any shape may be used, and a few examples are illustrated in my previous U.S. Pat. No. 4,815,784 to Zheng, the entire disclosure of which is incorporated by this reference as though fully set forth herein. For example, the closed loops 26 and 28 may be circular, oval, truncated circular, truncated oval, substantially rectangular, or any other variety of shapes.

Figure 6A:
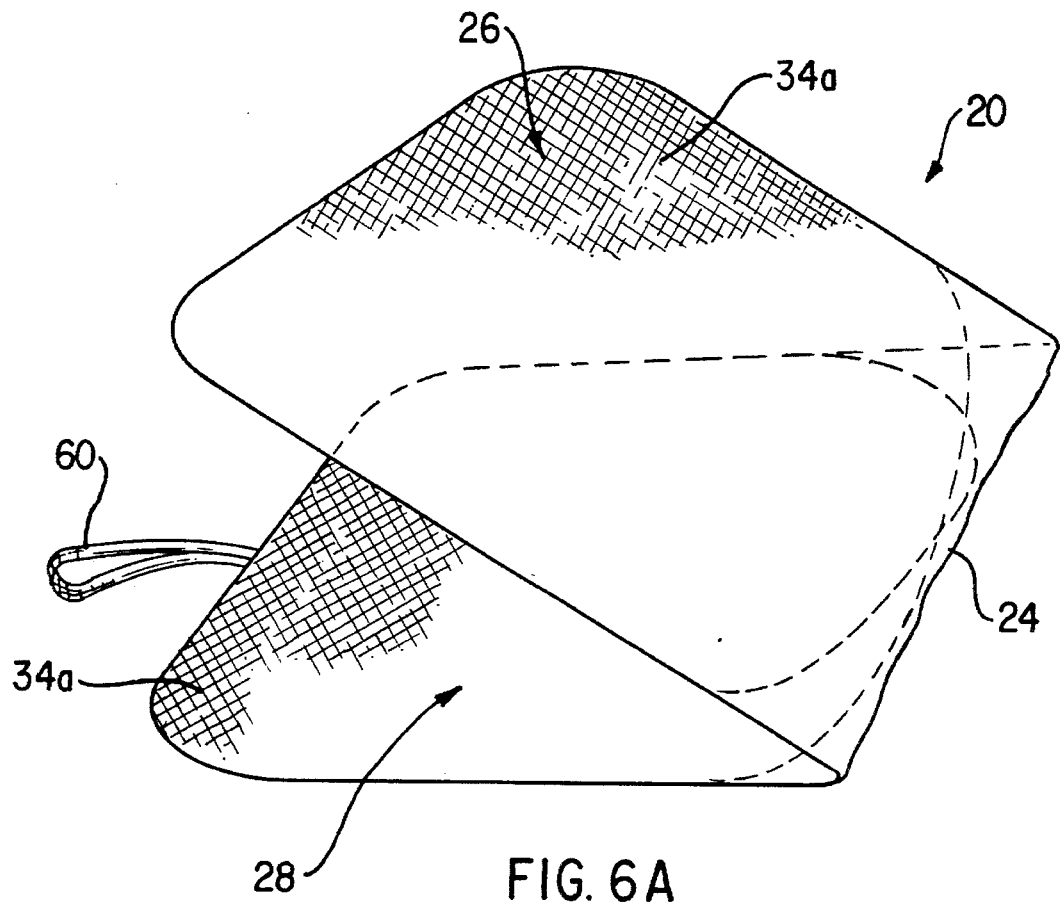
FIGS. 6(A) through 6(F) illustrate how the sunshield of FIG. 1 may be twisted and folded for compact storage.
Figure 6B:
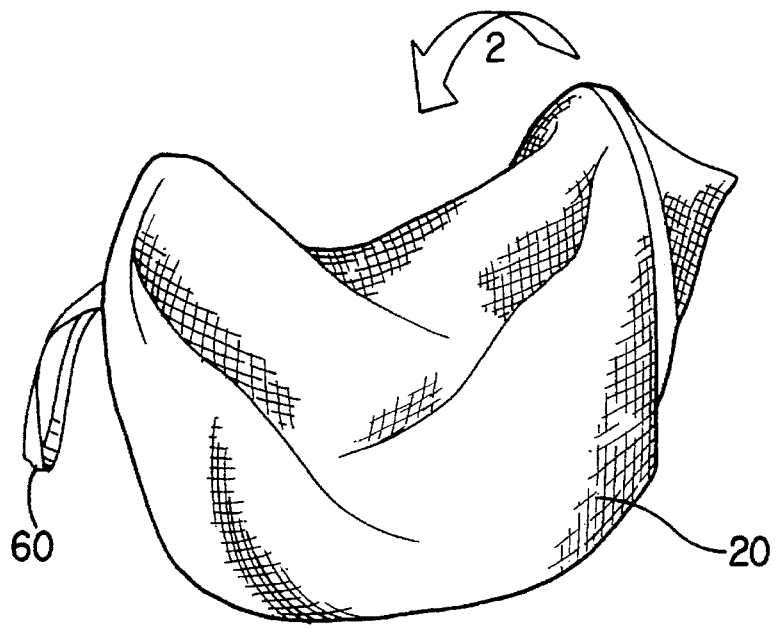
Figure 6C:
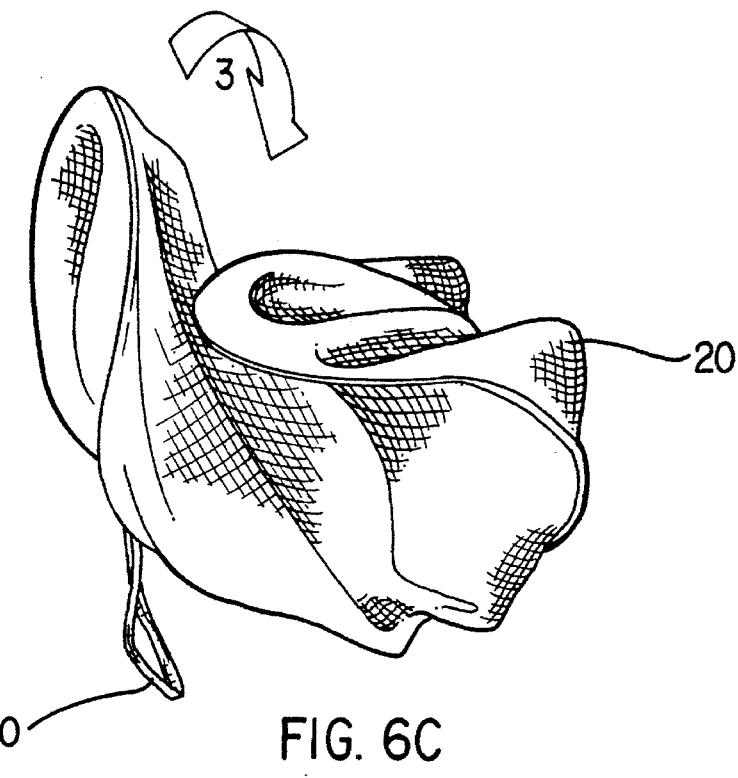
Figure 6D:
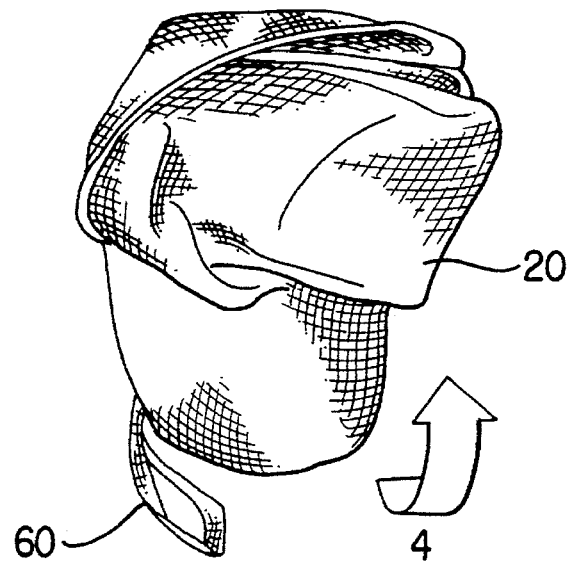
Figure 6E:
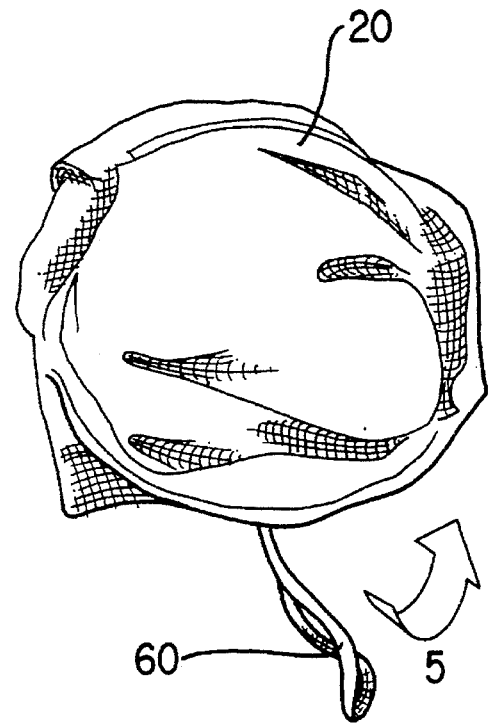

FIGS. 6(A) through 6(F) describe the various steps for folding and collapsing the sunshield 20 of FIG. 1 for storage. In FIG. 6(A), the first step consists of folding the two closed loops 26 and 28 together about the overlapping portion 24 which acts as a hinge. This first step is easily accomplished because the natural biasing action of the Figure-8 loop member 22 will cause the closed loops 26 and 28 to fold towards each other. When the two closed loops 26 and 28 are folded together, the second step, shown in FIG. 6(B), is to twist and fold the combined structure to initially collapse the loops and fabric into a smaller diameter. As shown in FIG. 6(C), the third step is to fold in the opposite side of the combined structure upon the previous fold to further collapse the combined closed loops. As shown in FIG. 6(D), the fourth step is to continue the collapsing so that the size of the structure is a fraction of the diameter of the initial structure. FIG. 6(E) shows the fifth step with the closed loops 26, 28 and fabric panels collapsed on each other to provide for a small essentially compact configuration having a plurality of concentric closed loop rings and layers of fabric so that the collapsed structure has a size which is a fraction of the size of the structure of FIG. 6(A).

Figure 6F:
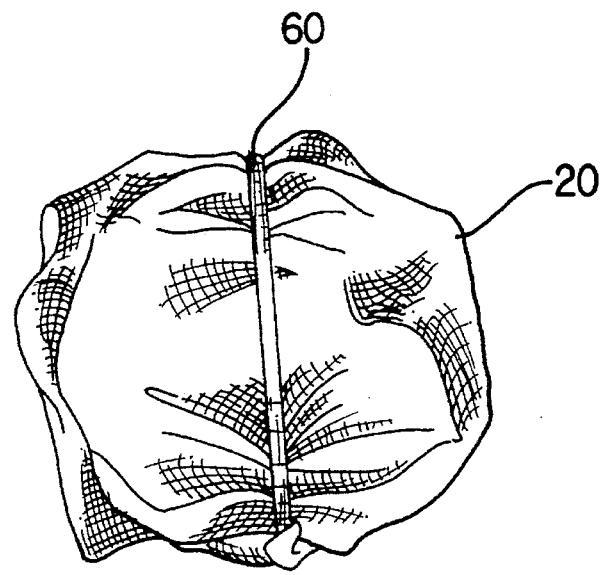

In addition, referring to FIGS. 1 and 6(F), a retaining member 60 may be attached to one end of the sunshield 20, and may be used to tie or hold the collapsed sunshield 20 in the collapsed position. Alternatively, a bag (not shown) may be used to store the collapsed sunshield 20.

Figure 7:
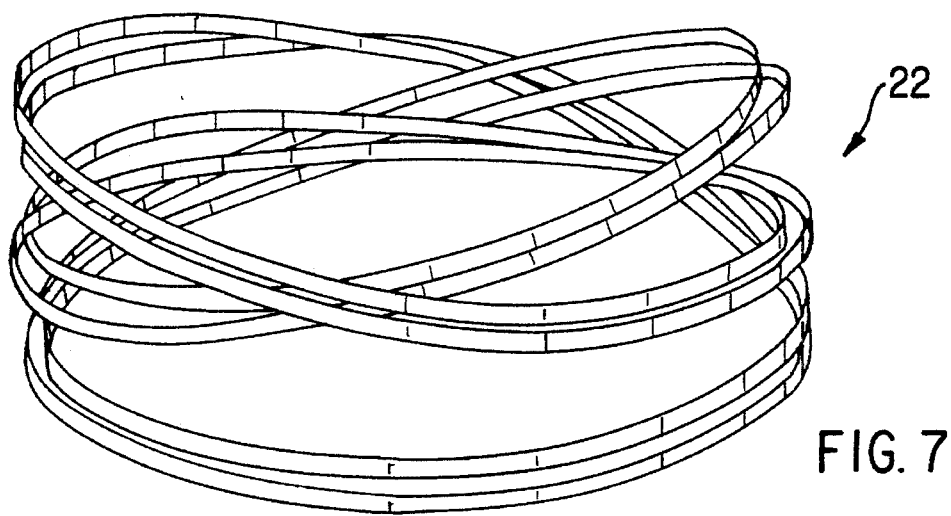
FIG. 7 illustrates the resilient loop member of FIG. 2 in a folded position illustrating how the loop member is folded to provide for two sets of three loop portions to thereby substantially reduce the size thereof.

FIG. 7 illustrates closed loops 26 and 28 of the loop member 22 in the collapsed position. The structure of each closed loop 26 and 28 essentially consists of two sets of three loop rings intertwined to lie flat. In the collapsed position, the structure would have a diameter of less than twelve inches, which makes it easy to store the sunshield inside an automobile.

Figure 9:
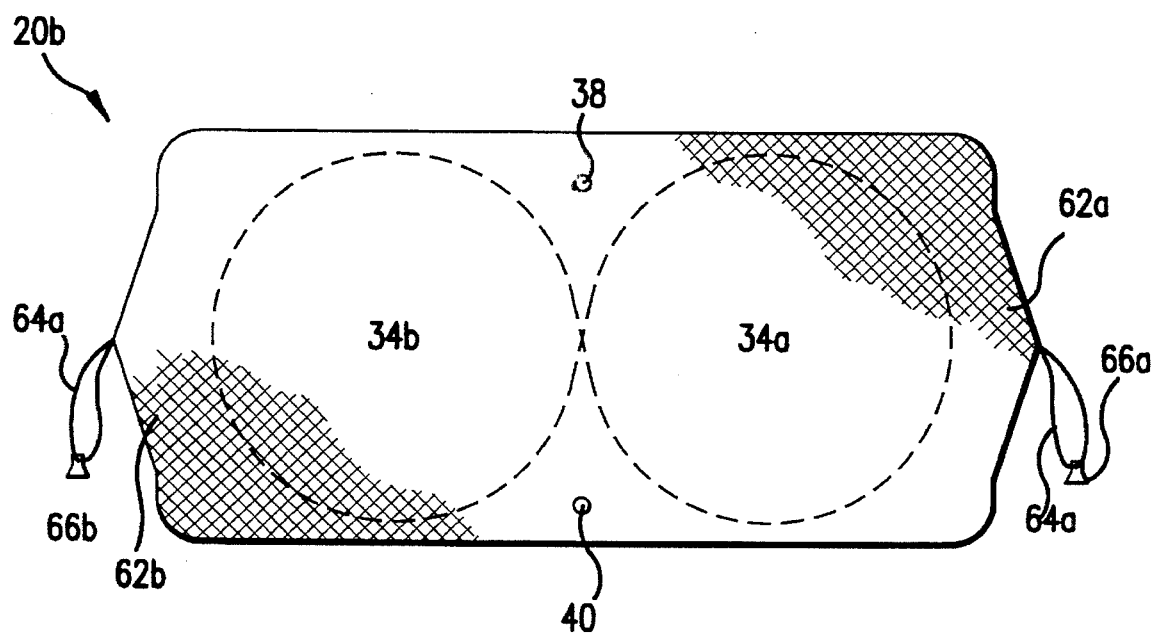
FIG. 9 is an elevational view of a third embodiment of the sunshield according to the present invention illustrating certain modifications made to the sunshield of FIG. 8.

FIG. 9 illustrates modifications that can be made to the sunshield 20a to allow for an alternative use of the sunshield 20a. The sunshield 20b in FIG. 9 is the same as sunshield 20a illustrated and described in FIG. 8 above, and the same principles and modifications described hereinbelow can likewise be applied to the other sunshields 20 of FIG. 1, 20c of FIG. 10 and 20d of FIG. 11.

In sunshield 20b, each fabric piece 34a, 34b is provided with an adjoining fabric piece 62a, 62b to which is attached one end of an elastic member 64a, 64b. A suction cup 66a, 66b is attached at the other free end of the elastic member 64a, 64b, respectively. Although the sunshield 20b is illustrated as having adjoining fabric pieces 62a, 62b, they can be omitted so that the elastic members 64a, 64b are directly attached to the periphery of the fabric pieces 34a, 34b.

This modified sunshield 20b may be used to cover the outside of a front windshield or rear window of an automobile from snow and ice. In operation, the suction cups 38 and 40 are used to attach the window-facing sides 36a, 36b of the sunshield 20b against the outside of an automobile windshield or rear window, in the same manner described above for deploying the sunshield 20 against the inside of a windshield or rear window. The elastic members 64a, 64b are then stretched around the frame 44 of the automobile 50 and the suction cups 66a, 66b are attached to the inside of the same automobile windshield or rear window to hold the sunshield 20b securely in place on the outside of the windshield or rear window. The two automobile side doors are then closed so that a portion of each adjoining fabric piece 62a, 62b is held between the side doors and the frame 44.

Thus, the sunshield 20 of the present invention uses a Figure-8 loop member 22 as its support, the Figure-8 configuration of this loop member 22 carrying a natural bias to fold its two closed loops 26, 28 together. This natural bias enables the sunshield 20, when equipped with one or more suction cups 38, 40, to be used effectively with all windows of an automobile, including the windshield, the side windows and the rear window, and on both the outside and the inside of the windshield and the rear window. In this regard, only one or two suction cups are needed because the natural bias to fold the closed loops together will obviate the need for additional suction cups to be provided at the outer ends of the sunshield 20. This reduces the complexity of the construction of the sunshield 20, and also makes it more convenient to deploy in position and to store. The natural bias of the Figure-8 loop member 22 also makes it easier to fold the sunshield during the folding and collapsing operation.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A collapsible sunshield for deployment against a window of an automobile comprising:

a collapsible flexible loop member assuming a Figure-8 configuration, the Figure-8 configuration defining two closed loops connected by an overlapping portion acting as a hinge portion, the Figure-8 loop member and the two closed loops each having an expanded position and a collapsed position;

a fabric for substantially covering the Figure-8 loop member, the Figure-8 loop member and its two closed loops substantially supporting the fabric in particular areas so that the fabric assumes the particular configuration of the Figure-8 loop member and its two closed loops in their expanded position; and the two closed loops and their associated fabric being foldable on top of each other about the hinge portion to have the closed loops and their associated fabric overlaying each other and with the overlaying closed loops collapsible to the collapsed positions by twisting and folding to form a plurality of concentric rings and layers of fabric to substantially reduce the size of the sunshield in the collapsed position.

2. The sunshield of claim 1, wherein the Figure-8 loop member has a natural bias that causes the two closed loops to fold toward each other about the hinge portion, and wherein the fabric includes a window-facing side.

3. The sunshield of claim 2, wherein the natural bias of the Figure-8 loop member causes the two closed loops to impinge against an automobile window when the sunshield is retained thereagainst.

4. The sunshield of claim 2, further comprising at least one attachment device provided on the window-facing side of the fabric.

5. The sunshield of claim 4, wherein the at least one attachment device is provided at a central portion of the sunshield.

6. The sunshield of claim 5, wherein the at least one attachment device comprises at least one suction cup.

7. The sunshield of claim 4, wherein the at least one attachment device comprises two suction cups, with one suction cup provided within one of the closed loops and its associated fabric, and with the second suction cup provided within the other closed loop and its associated fabric.

8. The sunshield of claim 6, wherein the at least one suction cup is adapted to be pressed against an automobile window when the sunshield is retained against the automobile window, and wherein the natural bias of the sunshield causes the two closed loops to impinge against the automobile window when the sunshield is retained thereagainst.

9. The sunshield of claim 7, wherein the suction cups are adapted to be pressed against an automobile window when the sunshield is retained against the automobile window, and wherein the natural bias of the sunshield causes the two closed loops to impinge against the automobile window when the sunshield is retained thereagainst.

10. The sunshield of claim 2, wherein a layer of reflective material is provided on the window-facing side.

11. The sunshield of claim 1, wherein the sunshield further comprises a loop retaining portion provided along the fabric, and wherein the sunshield further comprises a sleeve provided along the loop retaining portion for retaining the Figure-8 loop member.

12. The sunshield of claim 1, wherein the two closed loops are disposed substantially symmetrical to each other and are substantially equal in size.

13. The sunshield of claim 1, wherein the fabric further comprises two fabric pieces, one for covering each closed loop, and wherein the sunshield further comprises two elastic members, each elastic member having a first end attached to a separate one of the two fabric pieces, and wherein each elastic member has a second free end with a suction cup attached thereto.

14. A method of deploying a collapsible sunshield against a window of an automobile, comprising the steps of:

(a) providing a collapsible sunshield comprising:

(i) a collapsible flexible loop member assuming a Figure-8 configuration, the Figure-8 configuration defining two closed loops connected by an overlapping portion acting as a hinge portion, the Figure-8 loop member having a natural bias that causes the two closed loops to fold toward each other about the hinge portion; and (ii) a fabric for substantially covering the Figure-8 loop member, the Figure-8 loop member and its two closed loops substantially supporting the fabric in particular areas so that the fabric assumes the particular configuration of the Figure-8 loop member and its two closed loops in their expanded position, the fabric having a window-facing side;

(b) providing at least one attachment device on the window-facing side of the fabric;

(c) positioning the sunshield against an automobile window to be covered, with the window-facing side of the sunshield facing the automobile window;

(d) attaching the attachment device to the automobile window; and (e) using the natural bias of the Figure-8 loop member to cause the two closed loops to impinge against the automobile window.

15. The method of claim 14, wherein the automobile window is a front windshield and wherein the automobile comprises two visors provided above the windshield, further comprising the step of:

(f) flipping down the visors against the sunshield to further retain the sunshield against the windshield.

16. The method of claim 14, wherein the automobile window is a front windshield and wherein the sunshield is deployed against the outside of the front windshield, further comprising the steps of:

(f) providing the fabric of the sunshield with two fabric pieces, one for covering each closed loop, and wherein the sunshield further comprises two elastic members, each elastic member having a first end attached to a separate one of the two fabric pieces, and wherein each elastic member has a second free end with a suction cup attached thereto; and (g) attaching the suction cups of the elastic members to the inside of the front windshield.

* * * * *